Oct. 17, 1961 W. F. MORRIS, JR 3,004,407
CONTINUOUS POULTRY CHILLER APPARATUS AND METHOD
Filed April 19, 1960

INVENTOR.
William F. Morris, Jr.
BY
David Rabin
ATTORNEY

3,004,407
CONTINUOUS POULTRY CHILLER APPARATUS AND METHOD
William F. Morris, Jr., Raleigh, N.C., assignor to Morris and Associates, Inc., Raleigh, N.C., a corporation of North Carolina
Filed Apr. 19, 1960, Ser. No. 23,170
6 Claims. (Cl. 62—374)

The present invention relates to apparatus for continuously chilling poultry and relates more particularly to an apparatus and method for continuously chilling individual masses of poultry by advancing a unit or segregated mass of birds through a liquid chilling medium and subjecting the poultry mass to progressively colder chilling medium temperatures as the poultry mass is advanced along a directed path of travel while positively and constantly agitating and circulating the chilling medium at selected intervals.

In the processing of poultry it is highly desirable to remove the sensible body heat of the freshly killed birds as quickly as practical in order to eliminate, among other factors, deterioration of the meat to preserve the natural flavor and to reduce the chilling time cycle. It has been found by the use of the apparatus and method disclosed in my copending patent application Serial No. 791,939, filed on February 9, 1959, that the aforementioned factors have been realized as well as the beneficial results of decreased processing costs, increased yield and greater productivity with a minimum space requirement of which this invention is another application utilizing other apparatus and methods.

It has been customary to cool or chill comestibles by submerging them in a suitable chilling media, and advancing the products to be chilled along a directed path of travel by means of a conveyor, such as shown in United States Patent Nos. 1,458,991 and 1,907,648. However, no provision has been made to circulate or agitate the chilling media effectively within the chilling tank at selected intervals to promote and implement the rate of heat transference. Rapid and effective heat removal is of paramount significance in the processing of poultry, not only because the time cycle is critical, but the individual birds may, by being compacted against each other as they are advanced through the chilling media provide an insulating blanket for each other. The quiescent chilling bath in which poultry is chilled that surrounds the poultry will be precluded from penetrating to remove the sensible heat due to the insulating effect produced by surrounding birds.

Therefore, it is an objective of this invention to provide an apparatus and method for chilling poultry continuously in which individual masses of poultry may be introduced into a tank containing a chilling medium and advancing the poultry continuously through the medium to reduce progressively the sensible heat by positively agitating and circulating the chilling medium along the directed path of travel of the poultry.

Another object of this invention is to provide an apparatus for chilling poultry in which conveying means is provided for advancing poultry continuously through a tank and in which tank means is provided for positively circulating at selected intervals a chilling medium transverse to the direction of travel of the conveying means throughout the longitudinal length of the tank.

A further objective of this invention is to provide an apparatus for chilling poultry continuously in which a tank is provided with means for conveying a mass of poultry through a chilling medium within the tank by advancing segregated masses of poultry through the chilling medium with means in the tank, extending longitudinally thereof, for producing positive transverse circulation of the chilling medium from the direction of travel of the segregated masses of poultry in a direction counterflow to the temperature gradient of the chilling medium.

Still another objective of this invention is to provide a process for chilling poultry continuously by quenching poultry in a chilling medium, advancing the quenched poultry in substantially isolated compartments in a directed path of travel through the chilling medium while positively agitating and circulating the chilling medium constantly in the compartments as they advance in the directed path of travel of the poultry.

Other objects and many of the attendant advantages of this invention for an apparatus and method of chilling poultry continuously will become more readily apparent to those skilled in this art from the following detailed description taken in conjunction with the accompanying drawing in which like characters of reference designate corresponding parts throughout the several views, and wherein.

Figure 1:
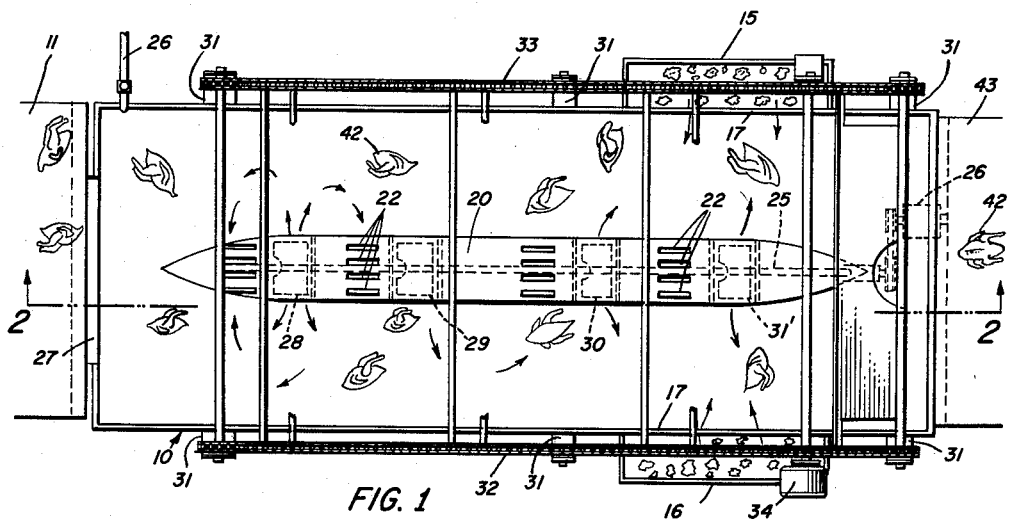
FIG. 1 is a top plan and generally schematic view of the continuous poultry chilling apparatus embodying this invention.
Figure 2:
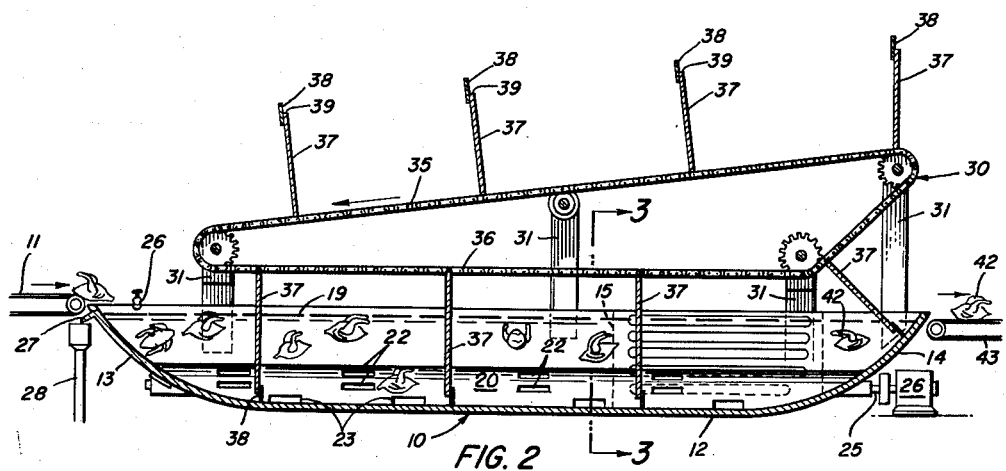
FIG. 2 is a substantially longitudinal view taken substantially along the plane of section line 2—2 of FIG. 1.
Figure 3:
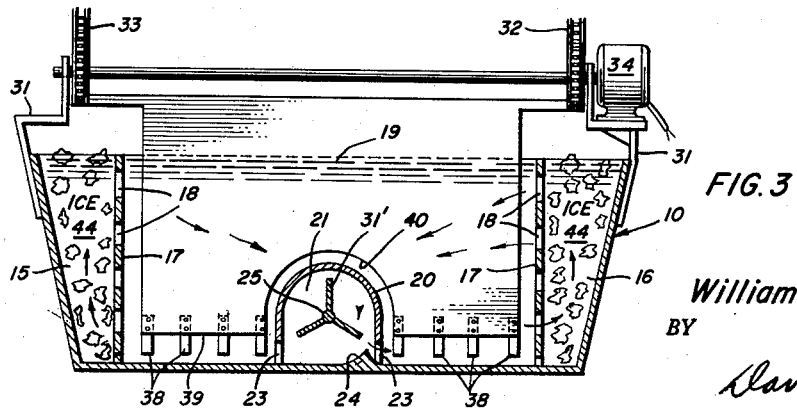
FIG. 3 is a transverse sectional view taken substantially along the plane of section line 3—3 of FIG. 2.

Referring to the drawing and more particularly to FIGS. 1 and 2, there is illustrated an apparatus for continuously chilling poultry which may be introduced randomly into the open top elongated tank or chilling vat 10 from the endless conveyor 11. Tank 10, preferably made of stainless steel or galvanized iron, is substantially rectangular in shape, in plan view, with the bottom 12 having upwardly curved end entrance and exit sections 13 and 14, respectively. A pair of laterally projecting compartments 15 and 16 are supported at the sides of the tank for retaining slush, chipped, briquette or other forms of ice therein. A baffle member 17, having openings 18 for the passage of the poultry chilling fluid or medium 19 therethrough, separates the compartments 15 and 16 containing the ice from the interior of the tank.

An inverted U-shaped shell or wall 20 extends longitudinally at the bottom of the tank and is suitably fastened thereto as by welding or other means to form a longitudinal chamber 21 at the base of the tank and preferably centrally thereof. A series of circumferentially spaced inlet openings 22 is selectively positioned longitudinally along the wall 20 to admit the free flow of the poultry chilling medium into the chamber 21. There is also provided a series of selectively spaced discharge openings 23 in the wall 20 with the openings 23 positioned preferably at the base of the wall 20 for discharging the chilling fluid from within the chamber at or close to the bottom of the tank in a direction transverse to the longitudinal axis of the chamber. In order to deflect and suitably proportion the flow of the fluid being discharged from within the chamber in both directions and transverse to the longitudinal axis of the chamber, a baffle member, such as the deflective vane 24, is provided in the chamber and supported in juxtaposition to one of the discharge openings 23 facilitating the distribution of the chilling medium.

An impeller shaft 25 extends longitudinally through the chamber 21 and is rotatably and bearingly supported at suitable intervals throughout (not shown) to be driven by the variable speed transmission and electric motor 26 that is mounted externally of the tank. Impeller blades 28 through 31' are mounted at selected positions on the shaft 25 in close proximity to the inlet openings 22 and the discharge openings 23 so as to direct the chilling fluid being discharged from within the chamber against the vane 24 to induce the flow of chilling medium 19 in the chamber 21 from the tank and force the circulation of the fluid from the discharge opening 23 transverse to the longitudinal axis of the chamber. The discharged fluid from the chamber generates sufficient positive agitation and circulatory flow through the tank at the various positions to accelerate the rate of heat transfer thereby removing the sensible heat from poultry introduced into the tank and traveling longitudinally therethrough. Sufficient pumping action of the impellers causes the chilling medium or fluid to flow into and out of the ice-retaining compartments 15 and 16 through the openings 18 in the baffle wall 17 thereby reducing the temperature of the fluid at least at the terminal portion of the tank. Furthermore, this transverse circulation and the positive flow of fluid from within the chamber will promote a counter-flow condition within the tank from the inlet to the discharge ends thereof particularly in view of the location of the ice-retaining compartments.

The tank 10 will be supplied with initial and makeup water, suitably treated, from the inlet line 26 and any overflow of the chilling medium will be discharged at the inlet end over the flange 27 and received in the drain line 28.

An overhead conveyor 30 is suitably supported on the tank by means of the brackets 31 or other suitable supporting frame work which may be mounted and supported from the ground. Laterally spaced apart endless conveyor chains 32 and 33, which may be driven by the motor 34 through the conveyor spindles and sprocket wheels, which are rotatably mounted in bearings to support substantially horizontal upper and lower traveling flights 35 and 36 of the conveyor chains. Poultry advancing panel members 37 are mounted to the conveyor chains 32 and 34 at selected intervals for movement therewith through the chilling medium. Each of the panel members 37 may be made of stainless steel or other suitable material and although solid panel members have been found to be desirable, with sufficient tolerance being provided at the sides and bottom of the tank, the panel members may be provided with suitable openings therein to reduce the resistance load for traveling through the chilling medium. When solid panel members are employed, depending flexible fingers or scraper elements 38, suitably fastened to the bottom edge 39 of the panel members, are desirable not only to reduce the resistance to movement of the panels through the chilling medium but to advance any poultry tending to fall to the bottom of the tank. A suitable arcuate portion 40 is removed from each of the panel members 37 to cooperatively receive and pass over the wall 20 as the panel members advance in the directed path of travel through the tank.

At the termination of the chilling, the poultry is elevated by the panel members the lower ends of which remain in close communication with the upwardly contoured end 14 of the tank and the birds 42 will slide or roll off the panel members onto the endless conveyor 43.

The ice 44 supplied and retained in the ice-receiving compartments 15 and 16 may be in the form of a slurry or ice and water as prepared by the apparatus disclosed in my pending patent application Serial No. 599,986, filed on July 25, 1956, or in the form of briquette ice as formed thereby, or any other forms of ice. It is desirable that the ice retained in the compartments remain loose and not compacted in order to permit a relatively free flow of the chilling medium through the openings in the baffle permitting circulation of the chilling medium from the central pumping chamber 21.

By employing the apparatus as hereinabove described, a mass of freshly killed poultry may be quenched in the chilling medium at the entrance to the tank wherein the chilling medium may have an exit temperature in the range of 50 degrees F. to 65 degrees F. A pair of traveling panel members 37 will form between them an isolated chamber or compartment for advancing a mass of chickens in a directed path of travel through the chilling medium without interference from other chickens or from adjacent compartments. As the segregated mass of poultry is advanced, the temperature of the chilling medium decreases progressively due to the counterflow of the fluid and the fluid in each of the advancing compartments or chambers between the panel members will be subjected to a positive agitation and circulation. This positive agitation and circulation causes maximum heat transfer as the fluid flows transversely within and across the chambers as they move longitudinally in the tank. Flow of fluid in the tank in the vicinity of the ice compartments 15 and 16 will reduce the temperature of the chilling medium considerably to the lowest temperature, which may normally be in the range of 32 degrees to 38 degrees F., so that the chickens leaving the bath will be at a temperature of approximately 34 to 38 degrees F. The time cycle for chilling the poultry will vary depending upon the gross weight of poultry to be chilled, the volume and temperature of the chilling medium, the rates of flow fluid and poultry, among other factors, all of which may readily be determined for each set of operating conditions.

Obviously many modifications and variations may be made to the apparatus by installing individual pumping units at selected intervals in the path of poultry travel within the tank as well as incorporating additional ice-receiving compartments, all within the purpose and spirit of this invention without departing from the ultimate expressed objectives and such modifications are contemplated.

What is claimed is:

1. An apparatus for chilling poultry continuously comprising an open tank having at one end thereof at least one auxiliary ice storage chamber, said storage chamber having a baffle for fluid flow therethrough, a longitudinally extending inverted U-shaped shell mounted at the bottom of said tank having selectively spaced openings therein, at least some of said openings being positioned at the lowermost portions of the shell, a motor, a motor-driven impeller shaft extending longitudinally through the shell, a plurality of impellers selectively spaced along the shaft to discharge and circulate fluid through the spaced openings at the lowermost portions of the shell, means for directing the flow of fluid from the shell transverse to the longitudinal axis of the tank, a conveyor means supported above said tank and having longitudinally extending flight, a plurality of plate members supported at spaced intervals on the conveyor means to advance poultry in a directed path of travel through the tank.

2. An apparatus for chilling poultry continuously comprising an open tank having at one end thereof an auxiliary ice storage chamber, said storage chamber having a baffle for fluid flow therethrough, a longitudinally extending chamber at the bottom of the tank having selectively spaced openings therein to receive a chilling medium contained in the tank, at least some of said openings being positioned at the lowermost portions of the chamber, an impeller shaft extending longitudinally through the shell, means to drive said shaft, a plurality of impellers selectively spaced along the shaft to discharge and circulate fluid into the tank through the spaced openings at the lowermost portions of the chamber, means for directing the flow of fluid from the chamber transverse to the longitudinal axis of the tank, a conveyor means supported above said tank and having longitudinally extending flight, a plurality of plates supported at spaced intervals on the conveyor means to advance poultry in a directed path of travel through the tank.

3. An apparatus for chilling poultry comprising an open top tank having entrance and discharge ends, an ice-receiving section adjacent to the discharge end of the tank, a baffle between the tank and the ice-receiving section for fluid flow therethrough, a chamber extending longitudinally at the bottom of the tank, said chamber having a plurality of selectively spaced water inlet and discharge openings therein, a motor-driven impeller shaft rotatably mounted and extending longitudinally through said chamber, a motor for driving said shaft mounted externally of the tank, a plurality of impellers mounted on said shaft to induce fluid flow into said inlet openings and out of said discharge openings upon shaft rotation, baffle means within the chamber to direct the discharge flow of fluid transversely from the chamber, a conveyor means supported above the tank and extending longitudinally thereover, said conveyor means having a plurality of spaced poultry advancing panel members suspended therefrom, means for advancing said panel members in a directed path of travel through the tank forming poultry compartments between panel members for entrapping transverse fluid flow in the compartments during movement of the panel members in a directed path of travel from one end of the tank to the other.

4. An apparatus for chilling poultry comprising a tank, an ice-receiving compartment positioned at one side of the tank, means between the tank and the ice-receiving compartment for retaining ice in the compartment and permit fluid flow therethrough, a chamber extending longitudinally at the bottom of the tank, said chamber having a plurality of selectively spaced inlet liquid chilling medium and discharge openings therein, an impeller shaft extending through said chamber, means for rotating said shaft, a plurality of impellers mounted on said shaft at selective intervals therealong to induce fluid flow into and out of said chamber, conveyor means supported above said tank having a plurality of spaced poultry advancing panel members suspended therefrom forming poultry advancing compartments, means for advancing said panel members in a directed path of travel through the tank to urge poultry in the poultry compartments to move from one end of the tank to the other while transverse and circulatory fluid flow from the chamber.

5. An apparatus for chilling poultry comprising a tank for retaining a liquid chilling medium therein, axially spaced apart means at the bottom of the tank for agitating and circulating the chilling medium in a direction transverse to the longitudinal direction of the tank, conveyor means supported above said tank having a plurality of depending spaced poultry advancing panel members suspended therefrom, means for advancing said panel members in a directed path of travel longitudinally through the tank forming poultry advancing compartments between panel members for entrapping the transverse fluid flow of the chilling medium during movement of the poultry through the tank.

6. An apparatus for chilling poultry comprising an open top tank having entrance and discharge ends, a chamber extending longitudinally at the bottom of the tank, said chamber having a plurality of selectively spaced water inlet and discharge openings therein, a motor-driven impeller shaft rotatably mounted and extending longitudinally through said chamber, a motor for driving said shaft mounted externally of the tank, a plurality of impellers mounted on said shaft to induce fluid flow into said inlet openings and out of said discharge openings, means within the chamber to direct the discharge flow of fluid transversely from the chamber, conveyor means supported above the tank and extending longitudinally thereof, said conveyor means having a plurality of spaced poultry advancing panel members depending therefrom, means for advancing said panel members in a directed path of travel through the tank forming poultry compartments between panel members for entrapping transverse fluid flow from the chamber during movement of the panel members from one end of the tank to the other.

References Cited in the file of this patent

UNITED STATES PATENTS

| | | |
|---|---|---|
| 2,050,964 | Dean et al. | Aug. 11, 1936 |
| 2,678,512 | Maston | May 18, 1954 |
| 2,942,429 | Van Dolah et al. | June 28, 1960 |
| 2,979,914 | Garland | Apr. 18, 1961 |

FOREIGN PATENTS

| | | |
|---|---|---|
| 547,097 | Canada | Oct. 8, 1957 |